United States Patent [19]

Mikami et al.

[11] Patent Number: 5,790,364
[45] Date of Patent: Aug. 4, 1998

[54] CONTROL SYSTEM FOR LINEAR SOLENOID VALVE

[75] Inventors: Kazuhiro Mikami, Kariya; Kenji Suzuki, Okazaki; Muneo Kusafuka; Masayuki Sugiura, both of Anjo; Hiroshi Tsutsui, Nishio, all of Japan

[73] Assignee: Aisin AW Co., Ltd., Japan

[21] Appl. No.: 648,718

[22] Filed: May 16, 1996

[30] Foreign Application Priority Data

May 19, 1995 [JP] Japan .................................. 7-121454

[51] Int. Cl.$^6$ .................................................. H01H 47/02
[52] U.S. Cl. ............................................. 361/154; 361/152
[58] Field of Search ............................................ 361/152–154

[56] References Cited

U.S. PATENT DOCUMENTS

| | | | |
|---|---|---|---|
| 4,148,090 | 4/1979 | Kawai et al. | 361/154 |
| 4,745,514 | 5/1988 | Takeshima et al. | 361/154 |
| 4,878,147 | 10/1989 | Oyama et al. | 361/154 |
| 4,898,361 | 2/1990 | Bender et al. | 259/129.05 |
| 5,113,307 | 5/1992 | Meyer et al. | 361/154 |
| 5,160,928 | 11/1992 | Rigat-Esselin et al. | 363/124 |
| 5,311,548 | 5/1994 | Nikolaus | 375/22 |
| 5,335,565 | 8/1994 | Ito et al. | 477/131 |
| 5,442,515 | 8/1995 | Wallaert | 361/187 |

FOREIGN PATENT DOCUMENTS

| | | |
|---|---|---|
| 2648584 | 12/1990 | France . |
| 4109233 | 9/1992 | Germany . |
| 4140586 | 1/1994 | Germany . |
| 4329917 | 3/1995 | Germany . |
| 3199757 | 8/1991 | Japan . |
| 9408386 | 4/1996 | WIPO . |

OTHER PUBLICATIONS

Patent Abstracts of Japan, vol. 95, No. 12 26 Dec. 1995.

*Primary Examiner*—Fritz Fleming
*Attorney, Agent, or Firm*—Lorusso & Loud

[57] ABSTRACT

The control system for a linear solenoid valve controls output of an oil pressure according to a current value to be fed to the linear solenoid which operates the linear solenoid valve. A solenoid current monitor detects the current value fed to the linear solenoid and an IG voltage monitor detects the voltage level of the battery. A linear solenoid current value setting unit sets a target current value according to a target oil pressure level and a duty ratio setting unit sets a duty ratio for applying the battery voltage to the linear solenoid on the basis of signals coming from the current monitor, the voltage monitor and the current value setting unit. A solenoid driver applies the battery voltage to the linear solenoid for a predetermined period in accordance with the duty ratio set by the duty ratio setting unit. The duty ratio setting unit, in turn, includes: a feedback correction unit for feedback correction of the duty ratio, in accordance with the difference between the current value detected by the monitor and the target current value set by the current value setting unit, so that the current value fed to the linear solenoid approaches the target current value; and a voltage correction unit for further correcting the duty ratio, as previously corrected by the feedback correction unit, on the basis of the voltage level of the battery, as detected by the voltage monitor.

4 Claims, 5 Drawing Sheets

CONTROL SYSTEM FOR LINEAR SOLENOID VALVE

BACKGROUND OF THE INVENTION

1. Field of the Invention

The present invention relates to a control system for a linear solenoid valve to be used in a vehicle.

2. Related Art

In the control system disclosed in Japanese Application Laid-Open No. 199757/1991, filed by the present inventors, in order to obtain a target current value corresponding to a target oil pressure level, the current in a linear solenoid valve is detected so that feedback control for correcting the duty ratio of the power supply to the linear solenoid valve may be executed on the basis of the detected current. In this feedback control, a control gain is usually set to a relatively small value to gradually approach the target so that overshooting may be avoided.

In the case of the linear solenoid valve to be mounted in a vehicle, however, the power source is a battery, which also serves as a power supply for other devices. As a result, the voltage may fluctuate with the operation of the auxiliary equipment including the air conditioner and the windshield wiper, for example. As the voltage fluctuates, the current value also fluctuates as feedback control is performed to attain the target current value. Because of a relatively small control gain, as described above, the system cannot quickly respond to the fluctuation in the voltage, delaying achievement of the target current value.

As battery voltage drops from $V_1$ to $V_2$, as illustrated in FIG. 6, the PWM signal is correspondingly subjected to feedback control. Because of the relatively small control gain, as described above, the width $D_1$ of the PWM signal is narrow at the instant of the change in the battery voltage and gradually increases in the order of $d_1 < d_2 < d_3 < d_4 < d_5$. As a result, the current value first drops from $i_1$ to $i_2$ at the time of transition and then gradually restores to its original value.

In case, therefore, the linear solenoid valve is used for generating the line pressure in an automatic transmission, the line pressure may temporarily be over or below the target value.

SUMMARY OF THE INVENTION

The present invention has as its objective solution of the above-described problems and provision of a control system for a linear solenoid valve, which control system is capable of achieving a target oil pressure level, when a battery voltage fluctuates, by suppressing the fluctuation of the current fed to the linear solenoid valve.

In order to achieve the foregoing objective, the present invention provides a control system including: a linear solenoid valve for outputting an oil pressure according to a current value fed to a linear solenoid; a solenoid current monitor for detecting the current value fed to the linear solenoid of the linear solenoid valve; an IG voltage monitor for detecting the voltage level of the battery; a linear solenoid current value setting means for setting a target current value according to a target oil pressure level; duty ratio setting means for setting a duty ratio for applying the battery voltage to the linear solenoid on the basis of signals from the solenoid current monitor, the voltage level detection means and the current value setting means; and a solenoid driver for applying the battery voltage to the linear solenoid for a predetermined period of time, in accordance with the duty ratio set by the duty ratio setting means. The duty ratio setting means, in turn, includes: feedback correction means for feedback correction of the duty ratio in accordance with the difference between the current value detected by the current value detection means and the target current value set by the current value setting means, so that the current value fed to the linear solenoid approaches the target current value; and voltage correction means for further correcting the duty ratio, as previously corrected by the feedback correction means, on the basis of the voltage level of the battery, as detected by the voltage level detection means.

The voltage correction means preferably corrects the duty ratio in accordance with the ratio (Vig/Vo) of the voltage level (Vig) of the battery, as detected by the voltage level detection means, to the reference voltage (Vo=12 V). It is also preferred that the voltage correction means does not correct the duty ratio when the voltage level of the battery, as detected by the voltage level detection means, is outside of a predetermined range, e.g. 8 V< and >17 V.

The voltage level detection means, in a preferred embodiment, detects the battery voltage in synchronism with the predetermined period during which the power supply means supplies the battery voltage to the linear solenoid.

The duty ratio setting means preferably includes feed forward setting means for setting the duty ratio according to the target current value set by the current value setting means, in which case, the feedback correction means corrects the duty ratio set by the feed forward setting means.

DESCRIPTION OF THE PREFERRED EMBODIMENT

A preferred embodiment of the present invention will now be described with reference to the accompanying drawings.

Figure 1:
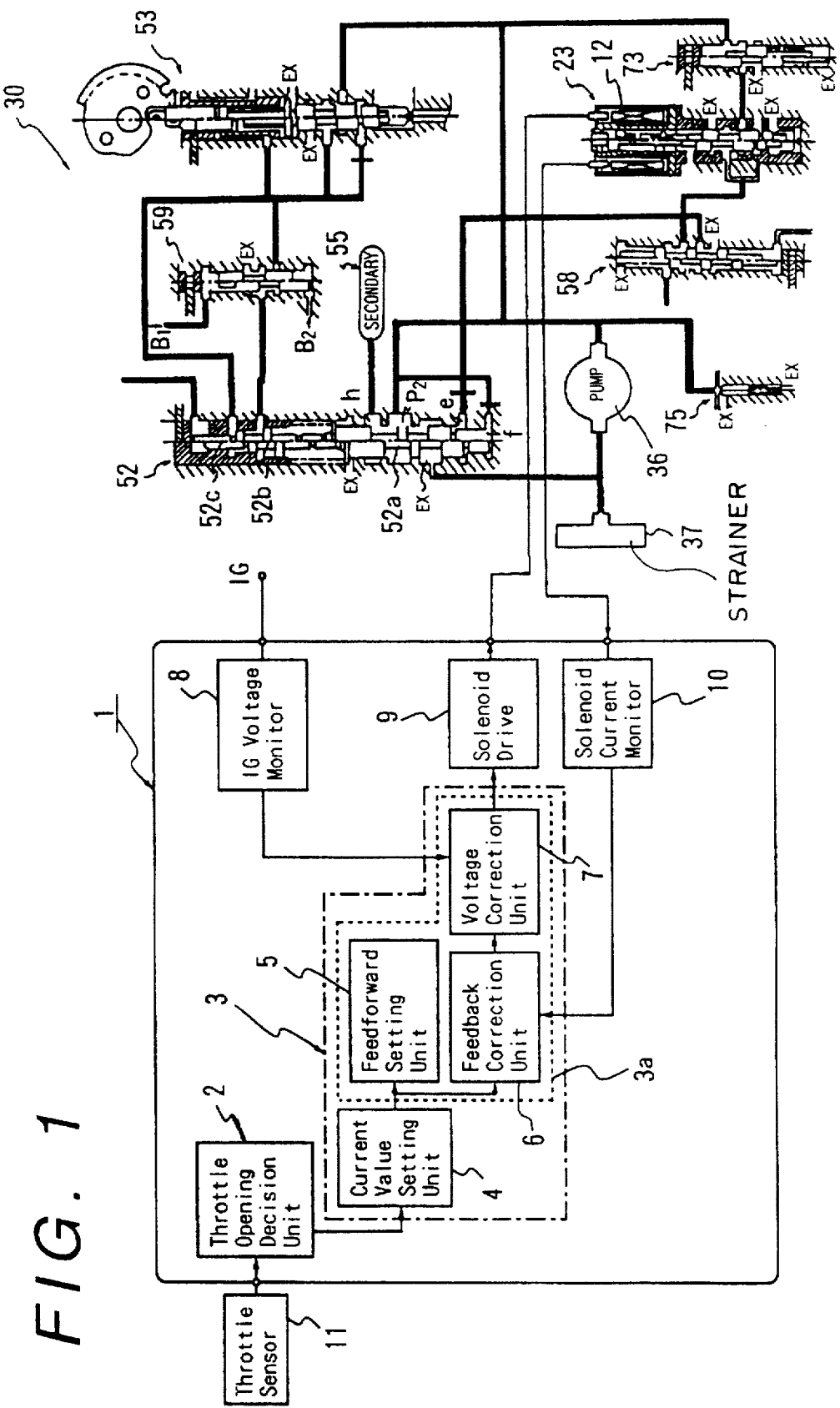
FIG. 1 is a diagram of the entire control system for a linear solenoid valve according to one embodiment of the present invention.

As shown in FIG. 1, an electronic control unit 1 receives a signal from a throttle sensor 11 and the throttle opening is decided by throttle opening decision unit 2. The decision of throttle opening decision unit 2 is sent to a linear solenoid current value setting unit (hereinafter "current value setting unit") 4. This current value setting unit 4 sets a linear solenoid current value for generating a line pressure corresponding to a predetermined throttle opening. The current value, as set in the current value setting unit 4, is output individually to each of a feed forward setting unit 5 and a feedback correction unit 6. The output of the feedback correction unit 6 is input to a voltage correction unit 7, the output of which is input to a solenoid driver 9 to control the current of the solenoid of linear solenoid valve 23.

Figure 2:
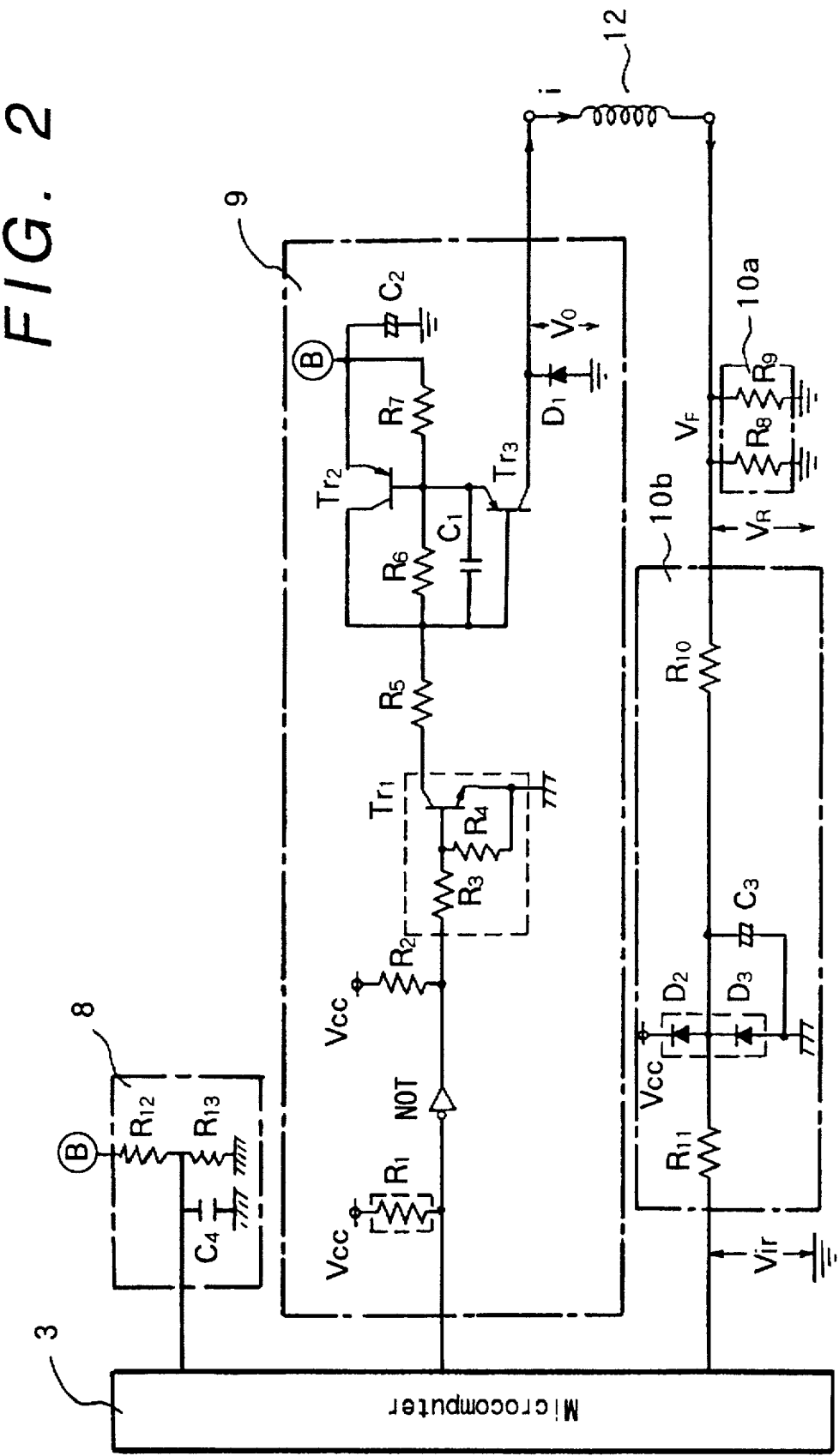
FIG. 2 is an electronic circuit diagram of a portion of a current control system utilized in the embodiment of FIG. 1.

The current control system will now be described with reference to FIGS. 1 and 2. As shown in FIGS. 1 and 2, the electronic control unit 1 receives the signal from the throttle sensor 11 to control the current to the solenoid 12 of the linear solenoid valve 23 so as to generate an oil pressure corresponding to the throttle opening.

Specifically, the electronic control unit (ECU) 1 is provided with a microcomputer 3 including: the current value setting unit 4 for receiving the signal from the throttle opening decision unit 2; the feed forward setting unit 5 for outputting a PWM (Pulse Width Modulation) signal; the feedback correction unit 6; and the voltage correction unit 7. ECU 1 further includes solenoid driver 9 for driving the linear solenoid 12 of the linear solenoid valve 23, a current monitor unit (or current monitoring resistor) 10a and a solenoid current monitor 10b.

In FIG. 2: $R_1$ to $R_{13}$ designate resistors; NOT designates a negative logic NOT circuit; $T_{r1}$ to $T_{r3}$ are transistors; $C_1$ to $C_4$ are capacitors; and $D_1$ to $D_3$ represent diodes.

Incidentally, the diode $D_1$ receives the surge inverse electromotive force of the linear solenoid 12 and functions to protect the transistor $T_{r3}$ from damage by the influence of the inverse electromotive force. An IG voltage monitor 8 divides the voltage of a battery B through the resistors $R_{12}$ and $R_{13}$ and inputs the divided voltage to the microcomputer 3.

Figure 3:
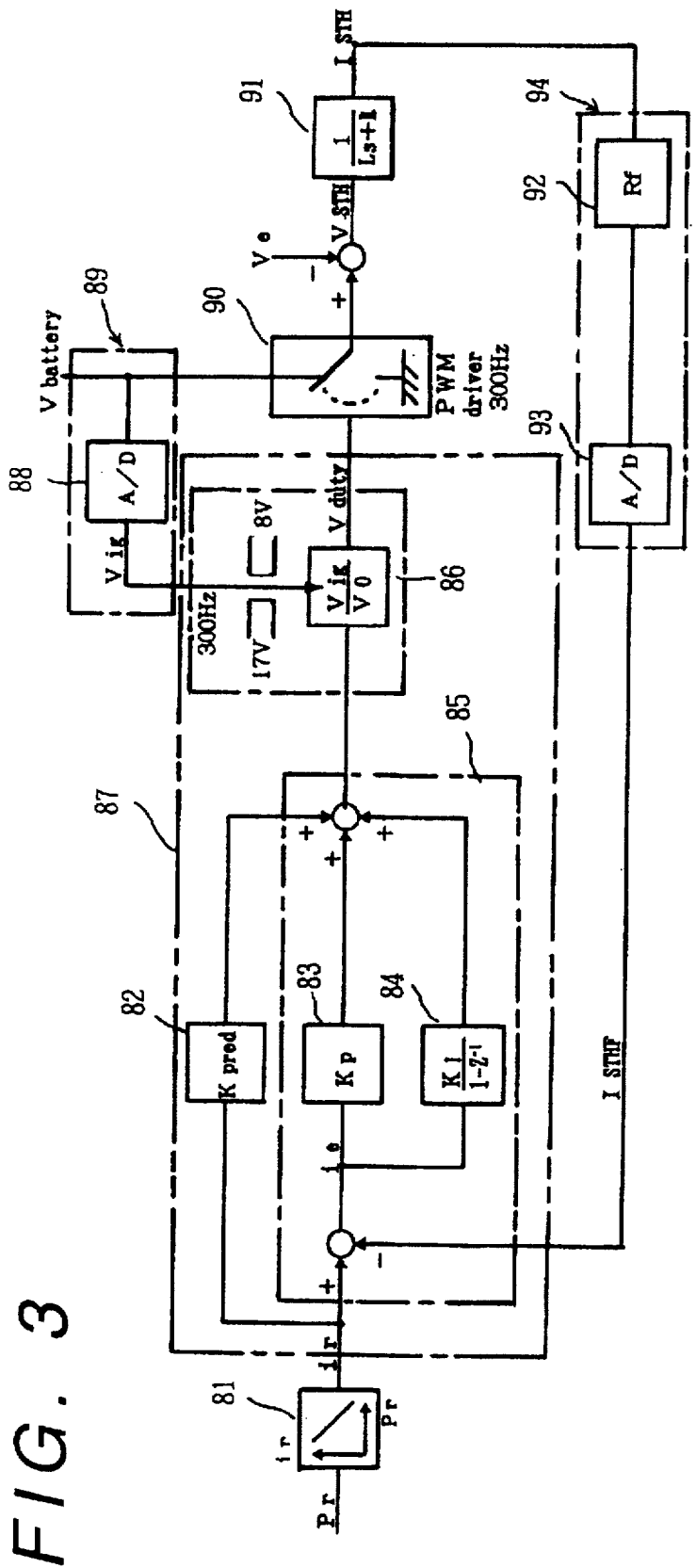
FIG. 3 is a block diagram of a control line for the linear solenoid valve in the embodiment of FIG. 1.

In FIG. 3, Pr designates a common throttle pressure (or target oil pressure level); ir is a command current; Kpred is the feed forward gain; Kp is a proportional gain; KI is an integration gate; Vbattery designates battery voltage; Vig represents the voltage level of the battery; Vo is a reference voltage (12 V); Vduty is the duty ratio after the voltage correction; Ve is the inverse electromotive voltage of the solenoid; V STH is the solenoid terminal voltage; Ls is the inductance of the solenoid; R represents the resistance of the solenoid; I STH represents a solenoid current; I STHF represents a current value of the solenoid; ie is the difference between the command current ir and the current value I STHF of the solenoid; and Rf is a current detection resistor. Further, S/D designates an analog/digital converter. Current value setting means 81 sets a linear solenoid current value corresponding to the command throttle pressure.

Duty ratio setting means 87 includes feedback correction means 85, voltage correction means 86 and feed forward setting means 82. Feedback correction means 85, in turn, includes a proportional feedback correction unit 83 for outputting a corrected duty ratio corresponding to the product obtained by multiplying the difference ie between the command current ir and the current value I STFF of the solenoid by the proportional gain Kp. Feedback correction means 85 further includes an integration feedback correction unit for integrating the difference ie to output a corrected duty ratio corresponding to the product obtained by multiplying the integrated difference by the integration gain KI.

Voltage level detection means 89 includes an A/D converter 88 for detecting the battery voltage fed through power supply means 90, which is composed of a PWM driver (300 Hz), to linear solenoid valve 91. Current value detection means 94 detects current I STH through the solenoid 91 and is comprised of a current detection resistor 92 and an A/D converter 93.

Operations of the above-described system will now be described in accordance with the difference between the current value detected by the solenoid current monitor 10 or the current value detection means and the target current value set by the current value setting unit 4 or the current value setting means. The feedback correction unit 6 feedback-corrects the duty ratio so that the current value fed to the linear solenoid 12 will approach the target current value.

On the basis of the current value of the battery, as detected by the IG voltage monitor 8 or the voltage level detection means, the voltage correction unit 7 or the voltage correction means further corrects the duty ratio which has previously been corrected by the feedback correction unit 6. As a result, if there is a difference between the target current value and the current value at the linear solenoid 12, the duty ratio is so corrected by the feedback correction unit 6 that the current value fed to the linear solenoid valve 12 will approach the target current value. Thus, it is possible to achieve the target current value.

If an abrupt fluctuation occurs in the battery voltage, the duty ratio to be output to the solenoid driver 9 (corresponding to the power supply means 90 of FIG. 3) is corrected by the voltage correction unit 7 on the basis of the voltage level of the battery, as detected by the IG voltage monitor 8. As a result, the duty ratio is corrected before receipt by the power supply for the linear solenoid 12. Therefore, the duty ratio is corrected according to the voltage level of the battery before it is feedback corrected so that fluctuation in the current to be supplied to the linear solenoid 12 can be suppressed without any delay. As a result, even if there is a fluctuation in the battery voltage, the fluctuation of the current in the linear solenoid 12 can be suppressed to achieve a stable oil pressure level matching the target. The voltage correction unit 7 corrects the duty ratio in accordance with the ratio (Vig/Vo) of the voltage level (Vig) of the battery, as detected by the IG voltage monitor 8, to the reference voltage (VO=12 V). As a result, it is possible to set a proper duty ratio promptly.

The IG voltage monitor 8 detects the battery voltage in synchronism with the predetermined period during which the solenoid driver 9 feeds the battery voltage to the linear solenoid 12.

Figure 5:
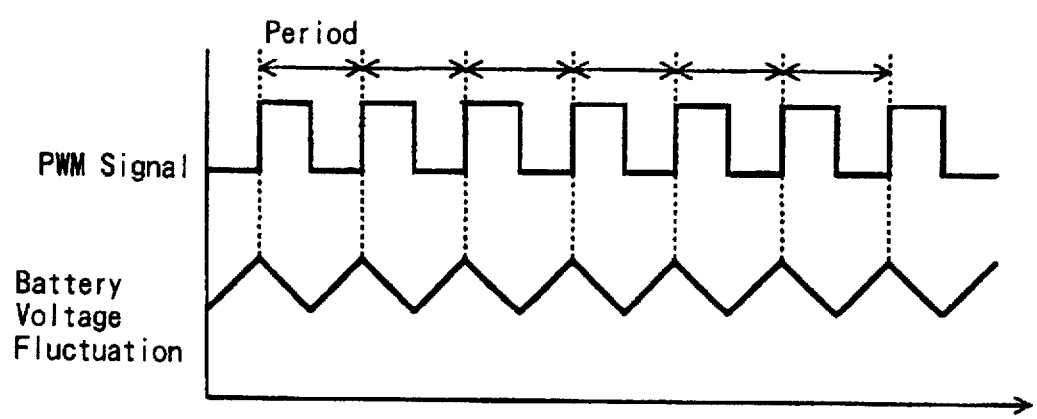
FIG. 5 is a time chart illustrating the relationship between a PWM signal and the detection of a battery voltage in the embodiment of FIG. 1.
Figure 6:
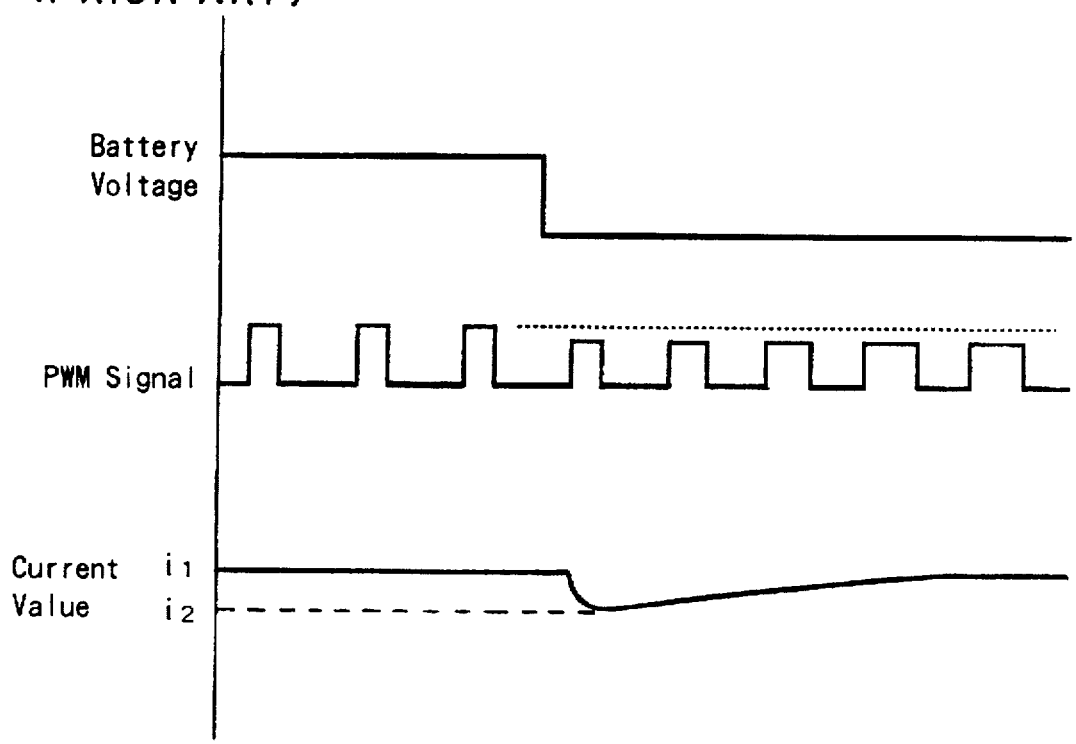
FIG. 6 is a control timing chart for coil current in a linear solenoid valve of the prior art.

Incidentally, a minute fluctuation of the voltage level of the battery may also be caused by the drive of the linear solenoid valve 23 itself. If a voltage absolutely independent of the period for the power supply to the linear solenoid 12 should be detected, the voltage level would change for each detected occurrence. Ideally response should be limited to fluctuations of the voltage level due to the operations of devices such as a windshield wiper and the fluctuation due to the drive of the linear solenoid valve 23 itself, if also detected, would make correct control impossible. Accordingly, in the present invention, the voltage of the battery is detected in synchronism with the period of the solenoid driver 9 (or the power supply means 90). As shown in FIG. 5, for example, the fluctuating battery voltage V is detected in synchronism with the period (300 Hz) of the PWM signal. As a result, the voltage level can always be detected in the same state as the power supply to the linear solenoid 12 to eliminate the fluctuation of the voltage due to the power supply to the linear solenoid 12 so that accurate control can be attained.

Moreover, the voltage correction unit 7 does not correct the duty ratio when the voltage level of the battery, as detected by the IG voltage monitor 8, is outside of a predetermined range (<8 V or >17 V). In other words, when the detected battery voltage is abnormal, it is believed that the detection by the IG voltage monitor 8 is not accurate. As a result, if the correction is performed responsive to the voltage, in the case of an abnormal battery voltage, the correction will be inaccurate. Therefore, in this case, i.e., outside the predetermined range lower than 8 V and higher than 17 V, a masking is provided to prevent the correction and erroneous control.

Duty ratio setting means 3a includes feed forward setting unit 5 for setting the duty ratio according to the target current value, as set by the current value setting unit 4, and the feedback correction unit 6 corrects the duty ratio, as set by the feedback setting unit 5. In order to improve responsiveness when the target oil pressure level is changed, the duty ratio according to the target current value is set by the feed forward setting unit 5 and is corrected by the feedback correction unit 6.

The hydraulic circuit 30 includes: the linear solenoid valve 23 operated by the linear solenoid 12; a pump 36; a strainer 37; a primary regulator valve 52 having a main spool 52a, an auxiliary spool 52b, a plug 52c, a control chamber e, a feedback port f, a line pressure port P2, a secondary regulator valve port h and a drain port EX; a throttle valve 53; a secondary regulator valve 55; a solenoid relay valve 58; a cutback valve 59; a solenoid regulator valve 73; and a pressure relief valve 75.

Thus, the primary regulator valve 52 has a control chamber e, for regulating the line pressure on the low side, in communication with the control pressure from the linear solenoid valve 23. On the basis of a signal from the (not-shown) sensor for detecting the position selected for the (not-shown) manual valve, the linear solenoid valve 23 is controlled to feed the control pressure from the linear solenoid valve 23 to the control chamber e at the time of shifting from neutral range N to drive range D or reverse range R. When the lockup clutch is to be controlled by the linear solenoid valve 23, for example, the control pressure from the linear solenoid valve 23 is fed through the solenoid relay valve 58 to the control chamber e.

The primary regulator valve 52 is so constructed that a biasing force, based upon the throttle pressure or the like, is applied to one end of the main spool 52a, whereas a feedback pressure from the line pressure port p2 is applied to the other end and so that a control pressure from the linear solenoid valve 23 is applied to a land. The primary regulator valve 52 also has a line pressure port $P_2$, drain port EX and secondary regulator valve port h communicating with the secondary regulator valve 55.

Figure 4:
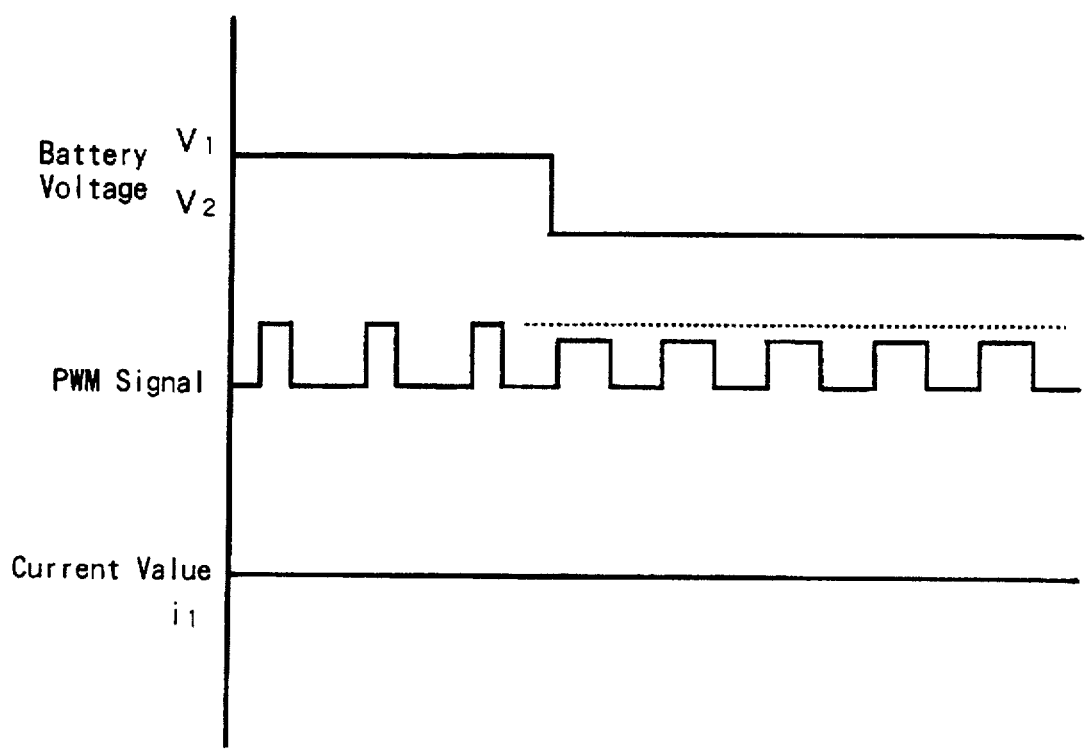
FIG. 4 is a control timing chart for coil current in the linear solenoid valve in the embodiment of FIG. 1.

With this construction, even if the battery voltage drops from $V_1$ to $V_2$, for example, as illustrated in FIG. 4, the duty ratio of the PWM signal is raised by the voltage correction unit 7 in instant response to the voltage drop so that the current value i to the linear solenoid 12 can be held constant.

The feedback correction means 6 corrects the duty ratio by feedback control in accordance with the difference between the current value detected by the current value detection means 10 and the target current value set by the current value setting means 4, so that the current value fed to the linear solenoid approaches the target current value. The voltage correction means 7 further corrects the duty ratio, as previously corrected by the feedback correction means 6, on the basis of the voltage level of the battery, as detected by the voltage level detection means 8. As a result, if there is a difference between the target current value and the current value at the linear solenoid 12, the duty ratio is so corrected by the feedback correction means 6 as to bring the current value fed to the linear solenoid 12 close to the target current value, so that the target current value can be attained.

If an abrupt fluctuation occurs in the battery voltage, the duty ratio to be output to the power supply means 9 is corrected by the voltage correction means 7 on the basis of the voltage level of the battery, as detected by the voltage level detection means 8, so that the duty ratio is corrected before supply to the linear solenoid 12 by the power supply.

As a result, the duty ratio is corrected according to the voltage level of the battery before it is feedback-corrected, so that fluctuation of the current to be fed to the linear solenoid 12 is suppressed. In other words, even with a fluctuation of the battery voltage, the fluctuation of the current through the linear solenoid 12 is suppressed to achieve a stable oil pressure value matching the target.

In the control system of the present invention, the voltage correction means 7 preferably corrects the duty ratio in accordance with the ratio (Vig/Vo) of the voltage level (Vig) of the battery, as detected by the voltage level detection means 8, to the reference voltage (Vo=12 V). As a result, a proper duty ratio is promptly set.

The voltage level detection means 8 detects the battery voltage in synchronism with the predetermined period for which the power supply means 9 supplies the battery voltage to the linear solenoid 12. Because a slight fluctuation of the voltage level of the battery is caused by the drive of the linear solenoid valve 23 itself, the voltage level of the battery is detected in synchronism with the period of the power supply to the linear solenoid 12. As a result, the fluctuation of the voltage due to the power supply to the linear solenoid 12 can be excluded to effect accurate control.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for a linear solenoid valve which is operated by a linear solenoid to output an oil pressure according to a current value fed to the linear solenoid, said control system comprising:

current value detection means for detecting the current value fed to the linear solenoid of said linear solenoid valve;

voltage level detection means for detecting battery voltage level of a battery;

current value setting means for setting a target current value according to a target oil pressure level;

duty ratio setting means for setting a duty ratio to apply the battery voltage to said linear solenoid responsive to signals from said current value detection means, said voltage level detection means and said current value setting means; and power supply means for applying the battery voltage to said linear solenoid for a predetermined period in accordance with the duty ratio set by said duty ratio setting means, wherein said duty ratio setting means includes:

feedback correction means for feedback correction of the duty ratio in accordance with the difference between the current value detected by said current value detection means and the target current value set by said current value setting means, so that the current value fed to said linear solenoid approaches the target current value;

voltage correction means for further correcting the duty ratio, as previously corrected by said feedback correction means, in accordance with the voltage level of the battery, as detected by said voltage level detection means;

wherein said voltage level detection means detects the battery voltage level in synchronism with said predetermined period during which said power supply means supplies the battery voltage to said linear solenoid.

2. A control system for a linear solenoid valve according to claim 1, wherein said voltage correction means corrects the duty ratio in accordance with the ratio of the battery voltage, as detected by said voltage level detection means, to a reference voltage.

3. A control system for a linear solenoid valve according to claim 1, wherein said voltage correction means does not correct the duty ratio when the battery voltage, as detected by said voltage level detection means, is outside of a predetermined range.

4. A control system for a linear solenoid valve according to claim 1, wherein said duty ratio setting means further includes feed forward setting means for setting the duty ratio according to the target current value set by said current value setting means, and wherein said feedback correction means corrects the duty ratio set by said feed forward setting means.

* * * * *